US006901357B1

(12) United States Patent
Patiejunas

(10) Patent No.: US 6,901,357 B1
(45) Date of Patent: May 31, 2005

(54) SYSTEM AND METHOD FOR SIMULATING NETWORK CONNECTION CHARACTERISTICS

(75) Inventor: Kestutis Patiejunas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/460,688

(22) Filed: Dec. 14, 1999

(51) Int. Cl.[7] .......................... G06F 17/50; G06F 11/00; G06F 15/16
(52) U.S. Cl. ........................... 703/14; 370/235; 709/228
(58) Field of Search .......................... 703/14; 709/224, 709/227, 231, 228; 370/235, 389, 236, 369, 248, 508

(56) References Cited

U.S. PATENT DOCUMENTS

| 4,703,477 | A | * | 10/1987 | Adelmann et al. ........... 370/474 |
| 5,440,719 | A | * | 8/1995 | Hanes et al. .................. 703/21 |
| 5,633,859 | A | * | 5/1997 | Jain et al. ..................... 370/234 |
| 5,862,362 | A | * | 1/1999 | Somasegar et al. ........... 703/21 |
| 5,881,237 | A | * | 3/1999 | Schwaller et al. ........... 709/224 |
| 5,918,020 | A | * | 6/1999 | Blackard et al. ............. 709/228 |
| 6,038,230 | A | * | 3/2000 | Ofek ............................ 370/389 |
| 6,119,168 | A | * | 9/2000 | Hashimoto et al. .......... 709/238 |
| 6,236,654 | B1 | * | 5/2001 | Egbert ......................... 370/392 |
| 6,252,851 | B1 | * | 6/2001 | Siu et al. ..................... 370/236 |
| 6,295,557 | B1 | * | 9/2001 | Foss et al. .................. 709/224 |
| 6,330,236 | B1 | * | 12/2001 | Ofek et al. .................. 370/369 |
| 6,442,141 | B1 | * | 8/2002 | Borella et al. ............... 370/248 |
| 6,453,345 | B2 | * | 9/2002 | Trcka et al. ................. 709/224 |
| 6,772,107 | B1 | * | 8/2004 | La Cascia et al. ............ 703/21 |

OTHER PUBLICATIONS

Ashok K. Agrawala and Dheeraj Sanghi, "Design and Evaluation of an Adaptive Flow Control Scheme", IEEE 1992 pp. 2391–2397.*

Jong Suk Ahn and Peter B. Danzig, Packet Network Simulation: Speedup and Accuracy Versus Timing Granularity, IEEE 1996, pp. 743–757.*

Lawrence S. Brakmo and Larry L. Peterson, Experiences with Network Simulation, ACM1996, pp. 80–90.*

Lixia Zhang, Virtualclock: A New Traffic Control Algorithm for Packet–Switched Networks, ACM 1991, pp. 101–124.*

(Continued)

Primary Examiner—Kevin J. Teska
Assistant Examiner—Dwin M. Craig
(74) Attorney, Agent, or Firm—Lyon & Harr, L.L.P.; Craig S. Fischer

(57) ABSTRACT

A system and method for simulating network connection characteristics by alteration of a network packet. In general, the method of the present invention includes providing a driver that is capable of accessing all outgoing and incoming network packets and altering a network packet to simulate a connection characteristic of the network. In particular, the method of the present invention includes receiving a network packet, assigning a new, simulated network address to the network packet and performing modification of the network packet to simulate certain network connection characteristics (including, for example, transmission delay, limited bandwidth, packet dropping, packet fragmentation, packet duplication and packet reordering). The system of the present invention includes a modification module for altering certain characteristics of a packet. The modification module includes an addressing module, for mapping a new, simulated network address to a network packet and a propagation module, for modifying a propagation characteristic of the network connection. In addition, the modification module includes a sequence module that alters an additional packet characteristic.

17 Claims, 10 Drawing Sheets

OTHER PUBLICATIONS

Elan Amir, Hari Balakrishnan, Srinivasan Seshan, Randy H. Kratz, "Efficient TCP over Networks with Wireless Links", Proceedings of HotOS–V, Orcas Is., WA, May 1995, 6 pages.*

K. Egevang, P. Francis "RFC 1631 The IP Network Adress Translator (NAT)", Network Working Group, Internet Engineering Taskforce, May 1994, pp. 1–10.*

* cited by examiner

SYSTEM AND METHOD FOR SIMULATING NETWORK CONNECTION CHARACTERISTICS

TECHNICAL FIELD

The present invention relates in general to computer network simulation and more particularly to a system and a method for simulating network connection characteristics by alteration of network packets.

BACKGROUND OF THE INVENTION

Capacity planning of a server used in a server/client wide-area network (WAN) is quickly becoming more important as the use of WANs (such as the Internet) rapidly increase. WAN servers often are used by Internet sites and must be able to efficiently handle the anticipated requests to the site. Capacity planning helps predict if and when system saturation will occur by testing the maximum user load and speed of the target server. Thus, accurate and realistic testing a server is a crucial foundation for building a network system.

One approach to testing a WAN server is to set up a test WAN that uses communication links, routers and clients at distant locations determine how the WAN server will behave. However, this approach is both expensive and time-intensive. Another approach is to connect the WAN server in a local area network (LAN) to test how the server will perform. One problem with this approach, however, is that characteristics of a LAN and of a WAN are usually very different. Thus, testing a WAN server on a LAN usually does not yield accurate results.

In general, the characteristics of a LAN connection are much different than the characteristics of a WAN connection because of different packet characteristics. A packet is a unit of information is transmitted as a whole from one device to another over a network. The packet usually includes a header (containing, for example, address information), error-control information and data. One connection characteristic that is different for a LAN and a WAN is packet propagation. For example, on a LAN, propagation of a packet over a network connection is virtually instantaneous because of the short distances required. Conversely, on a WAN, a packet usually travels large distances and takes much longer to reach its destination. In addition, a WAN usually includes network devices (such as communication links and routers) that impose delays that further slow the propagation of packets over the network.

Other packet characteristics also help to create differences between LAN and WAN connection characteristics. For example, network devices in a WAN (such as a router) often lose packets (known as packet dropping) and reproduce packets (known as packet duplication). In addition, WAN packets are often sent over different network paths so that a packet that was sent before another packet may arrive later in time. This leads to packet reordering at the receiving end, and the server must use additional resources to place the packets in the correct order. Further, WAN packets may be divided into several smaller packets by routers when the router is extremely busy. This packet fragmentation also imposes an extra burden on the server.

In order to account for the differences between LAN and WAN packets a device called a hardware simulator commonly is used. One problem, however, with hardware simulators is that they are expensive and do not provide simulation of all the above-mentioned network connection characteristics. For example, because a hardware simulator does not work at the network layer it cannot change the IP address or port of incoming or outgoing packets. This reduces the accuracy of the simulation because a LAN only sends packets from a limited number of sources. Conversely, a WAN server typically receives requests from sources having a wide range of IP addresses.

Accordingly, there exists a need for a network simulation system that provides realistic and accurate simulation of major network connection characteristics. This network simulation system would be able to realistically simulate the transmission speed and bandwidth of a network (such as a WAN) connection. In addition, the network simulation system would accurate simulate packet characteristics that affect a network connection, such as packet dropping, packet fragmentation, packet duplication and packet reordering. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention is a system and method for simulating network connection characteristics by alteration of network packets. The present invention provides simulation of major network connection characteristics and realistically simulates the effects that network devices (such as routers and communication links) impose on network packets. These effects include, for example, transmission delay, limited bandwidth, packet dropping, packet fragmentation, packet duplication and packet reordering. The present invention provides a wide range of realistic simulated effects on network connection characteristics that are useful in the testing and capacity planning of a network server.

The present invention includes a method for simulating connection characteristics of a network. In general, the method includes providing a driver that is capable of accessing all outgoing and incoming network packets, determining whether an alteration of a network packet is necessary and, if needed, altering a network packet to simulate a connection characteristic of the network. In particular, the method of the present invention includes receiving a network packet, assigning a simulated network address to the network packet and performing modification of the network packet to simulate certain network connection characteristics.

The system of the present invention includes a network simulation system that located within the network architecture to have access to both incoming and outgoing network packets. This system includes a modification module for altering certain characteristics of a packet. The modification module includes an addressing module, for replacing an original client network address of a network packet to a new client network address and a propagation module, for modifying a propagation characteristic (such as limited bandwidth and transmission delay) of the network connection. In addition, the modification module includes a sequence module that alters an additional packet characteristic (including, for example, packet dropping, packet fragmentation, packet duplication and packet reordering). The system also includes a queue module having an incoming queue and an outgoing queue for storing incoming and outgoing network packets, respectively. Network packets are stored in these queues for a specified time period to simulate transmission delays and limited bandwidth.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention is embodied in a system and method for simulating network connection characteristics. These connection characteristics are simulated by altering, for example, the timing, placement and structure of network packets. Network connection characteristics that may be simulated by the present invention include packet transmission delay, bandwidth constriction, packet loss, packet fragmentation, packet duplication and packet reordering. In addition, the present invention includes a network address translation feature for simulating multiple clients accessing a target server.

The present invention is particularly well-suited for use on a local-area network (LAN) to simulate connection characteristics of a wide-area network (WAN). Specifically, the present invention can provide a LAN server with simulated requests from a wide variety of clients. In addition, the present invention allows accurate and realistic testing of a WAN server on a LAN by altering LAN packets so that they simulate packets received and transmitted over a WAN. In other words, the target server functions as though it was connected to a WAN. Thus, the present invention provides an inexpensive, accurate and simple way to realistically test the performance and capability of a WAN server using a LAN system.

II. Exemplary Operating Environment

Figure 1:
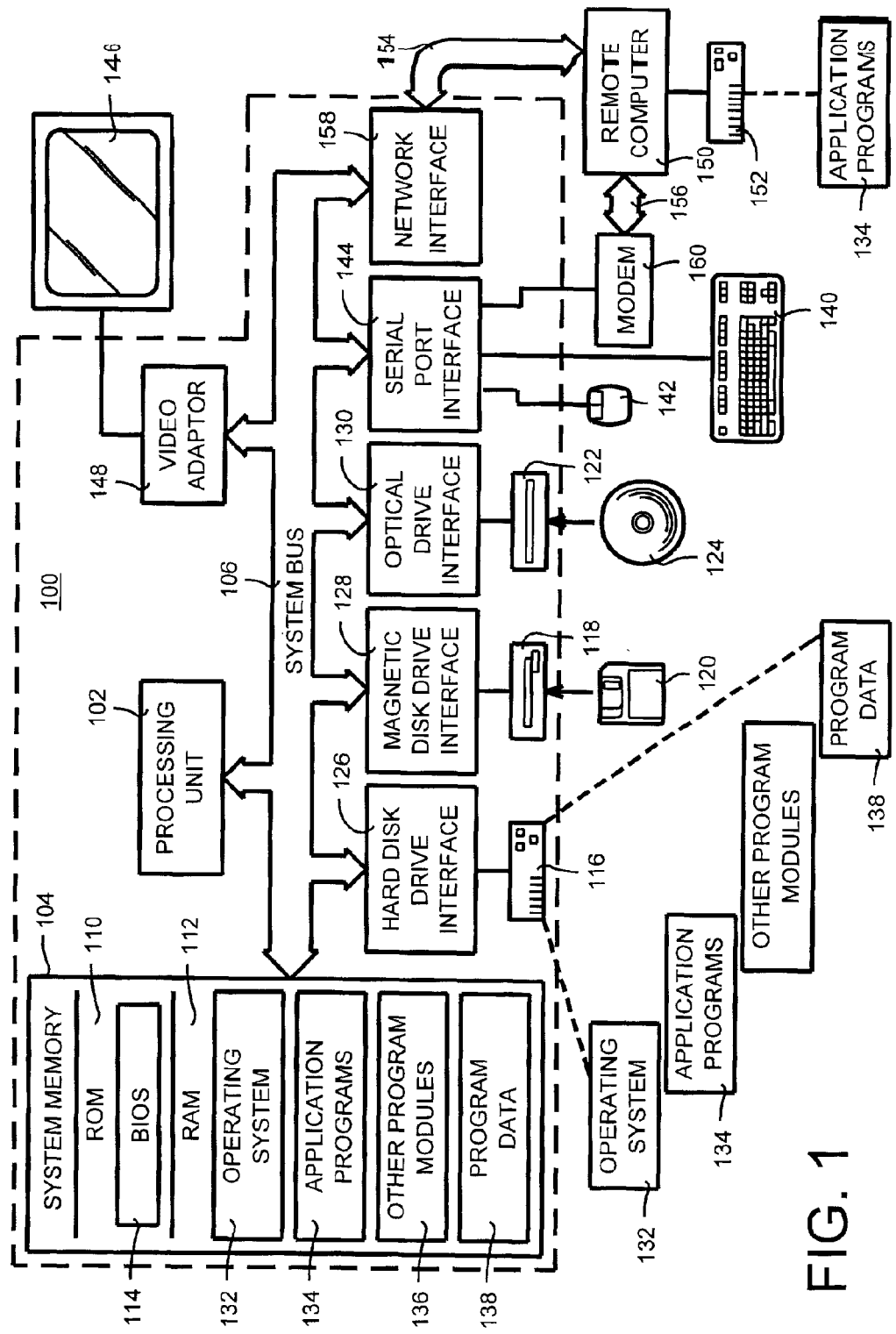
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, routers and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. Other input devices (not shown) including, for example, a microphone, joystick, game pad, satellite dish, camera, scanner, or the like may be connected to the personal computer 100. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. In addition, the personal computer 100 may be connected to a router that is connected to the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

III. General Overview

As shown in FIGS. 2–10 for the purposes of illustration, the present invention is embodied in a system and a method for simulating connection characteristics of a network by altering network packets. The present invention provides accurate and realistic simulation of network connection characteristics. In particular, the present invention is especially useful in providing inexpensive and realistic testing of a WAN server on a LAN system.

Figure 2:
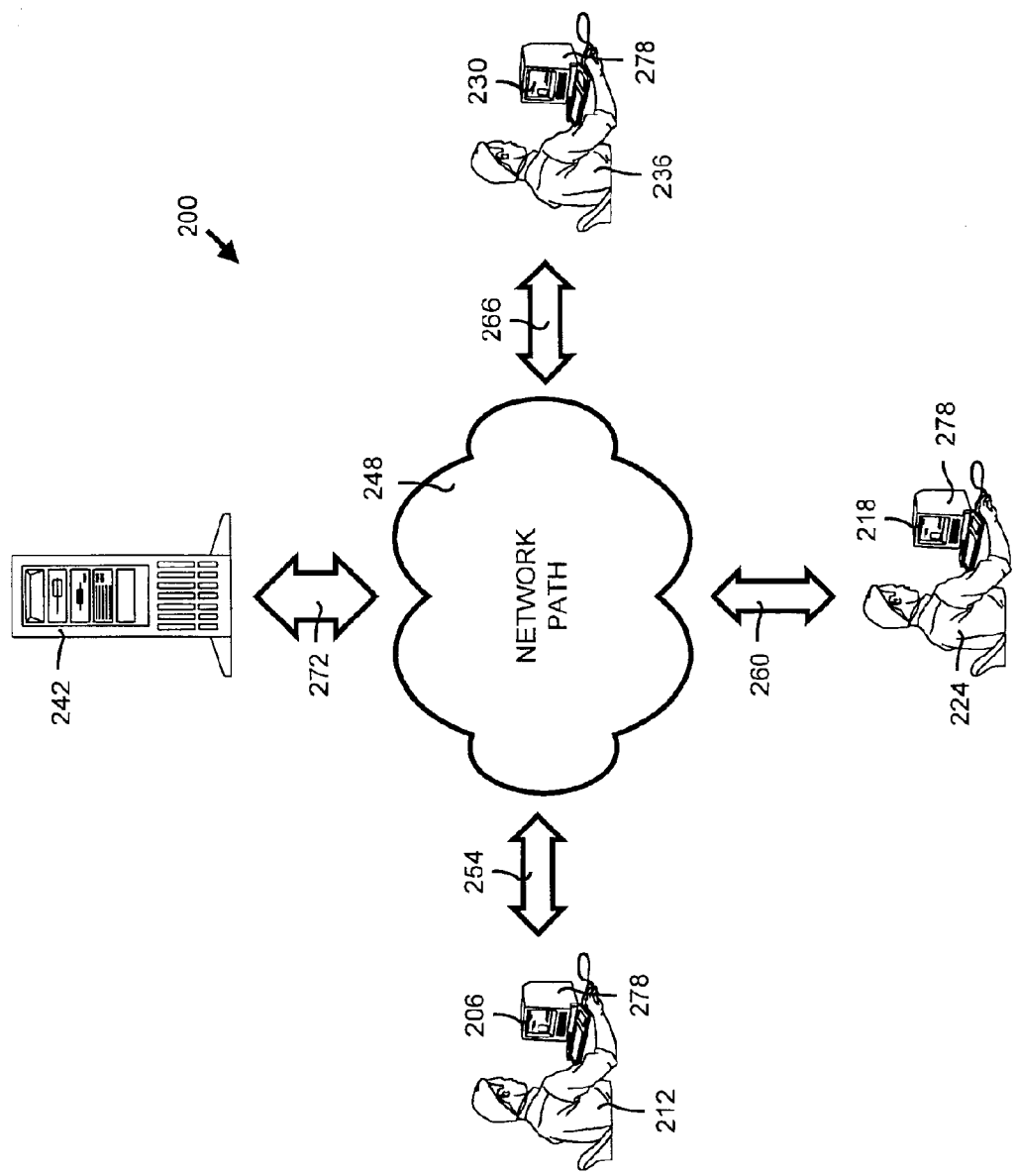
FIG. 2 is an overall block diagram illustrating an exemplary example of how the network simulation system of the present invention may be used.

FIG. 2 is an overall block diagram illustrating an exemplary example of how the network simulation system of the present invention may be used. This is only one of several examples of how the present invention may be used. In this exemplary example, the present invention is incorporated in a local-area network (LAN) 200 having a client/server network architecture. The LAN 200 includes a plurality of client machines having a first client 206 and a first user 212, a second client 218 and a second user 224, and a third client 230 and a third user 236. The LAN 200 also includes a target server 242 that is being tested. Although in this example the LAN 200 has a plurality of client machines (206, 218, 230) and a single server 242, other implementations of the present invention may include a different number of clients and servers.

Each of the clients (206, 218, 230) is connected to a network path 248 through a first network connection 254, a second network connection 260 and third network connection 266, respectively. Similarly, the target server 242 is connected to the network path 248 through a server network connection 272. For example, the network path 248 and network connections (254, 260, 266) may include network interface cards (NIC) and physical media that connect computers within the network (such as cabling as well as wireless communications).

In general, the network simulation system 278 of the present invention is designed to reside on a client machine. In this exemplary example, the network simulation system 278 resides on each of the clients (206, 218, 230) in the LAN 200. The network simulation system 278 of the present invention, which can be implemented in a variety of operating systems, network protocols and software architectures, is designed to be implemented on every client that accesses the server 242 or the network path 248.

The network simulation system 278 tests the target server 242 by providing a simulation of connection characteristics of a specific type of network. In this exemplary example, the network simulation system 278 simulates connection characteristics of a wide-area network (WAN). Thus, even though the target server 242 being tested is connected to in a LAN configuration, the target server 242 behaves and functions as though it were connected to a WAN. In this way, accurate and realistic testing of the target server 242 can be conducted on the LAN 200 to determine the behavior (such as maximum user load and throughput) of the target server 242 when connected to the WAN, without the expense and difficulty of setting up and testing the target server 242 on the WAN.

Figure 3:
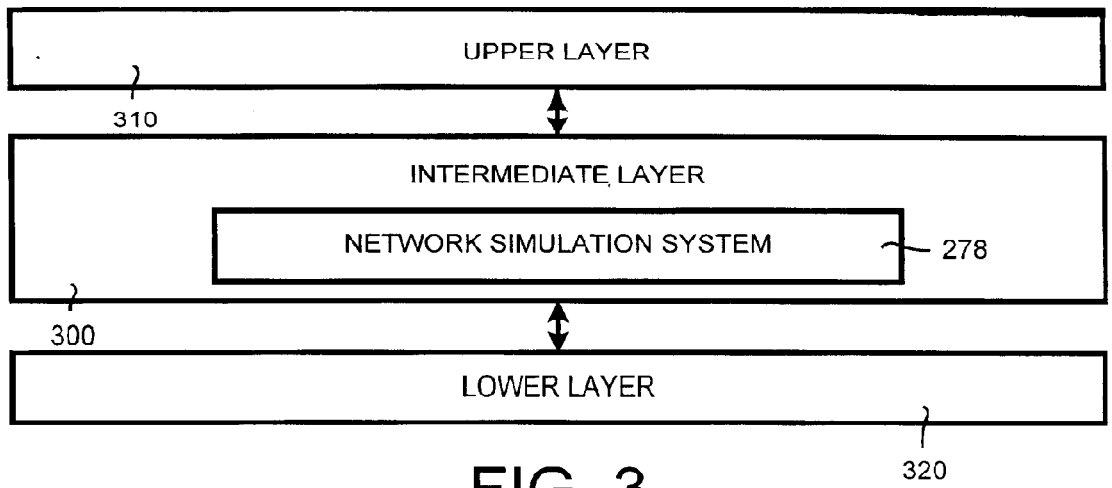
FIG. 3 is a general block diagram illustrating an implementation of the network simulation system of the present invention on a client machine.

FIG. 3 is a general block diagram illustrating an implementation of the network simulation system 278 of the present invention on a client machine. Implementation will be discussed in relation to a layered network model (such as the International Standards Organization (OSI) model), with each layer describing a different network activity, equipment or protocol. Generally, the lowest layers of the model relate to the network's physical media (such as putting data bits onto a network adapter card and cable) while the highest layers define how applications access communication services. Thus, the higher layers generally perform more complex tasks than the lower layers.

In general, the network simulation system 278 of the present invention is implemented so that the system 278 has access to all incoming and outgoing network packets. As shown in FIG. 3, this means that the network simulation system 278 is preferably implemented within an intermediate layer 300 situated between an upper layer 310 and a lower layer 320. In this preferred implementation, when a client is transmitting network packets, the system 278 can capture the packets after the upper layer 310 has processed the packets but prior to the lower layer 320 putting the packet onto the network's physical media. Similarly, when the client is receiving packets, the system 278 can capture the packets after they have been received by the lower layer 320 from the network's physical media and before processing by the upper layer 310.

Figure 4:
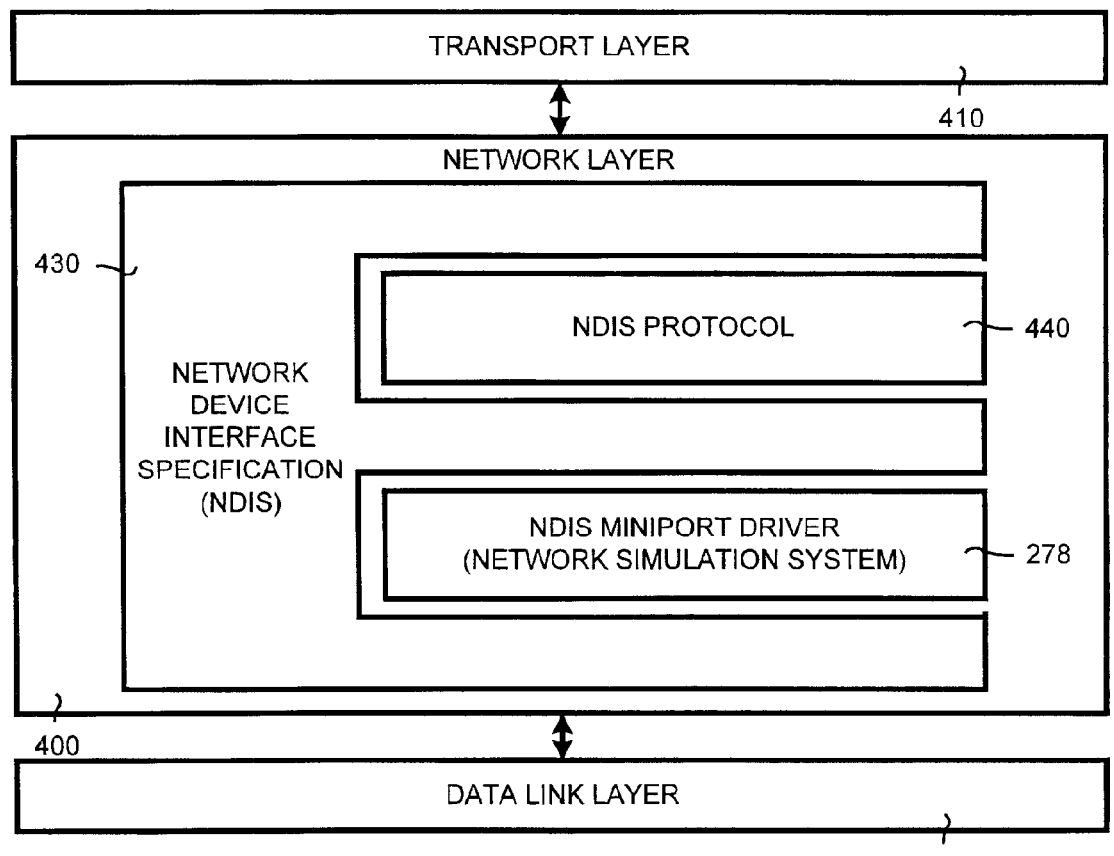
FIG. 4 illustrates a working example of a software architecture in which the present invention may be implemented.

FIG. 4 illustrates a working example of one way the present invention may be implemented. In this working example, the OSI layered network model consisting of seven layers is used and the network simulation system 278 of the present invention is implemented in the Windows® NT®, Windows® 2000® and Windows® 98®operating systems manufactured by Microsoft® Corporation and located in Redmond, Wash. Alternatively, the present invention may be implemented in any type of software architecture such that the present invention interacts with a flow of a network packet. For example, the present invention may be implemented in other types of operating systems (such as router operating systems) that support network device interface specification (NDIS) drivers. In this working example, the network simulation system 278 is implemented as an intermediate miniport driver 278 within a network layer 400. The network layer 400 is located between a transport layer 410 (a higher layer) and a data link layer 420 (a lower layer). In general, the network layer 400 manages and routes network packets, the transport layer 410 provides network packet flow control and error handling, and the data link layer 420 transmits and receives network packets from the network's physical media.

The network layer 400 includes NDIS drivers 430 with the network simulation system 278 implemented as a NDIS miniport driver located below an NDIS protocol layer 440 within the NDIS drivers 430. At this location as an NDIS miniport driver, the network simulation system 278 has access to all incoming and outgoing network packets. This provides the system 278 with the ability to intercept and filter all network packets before the packets are passed to either the transport layer 410 or the data link layer 420. In alternative embodiments, other implementations of the present invention as an intermediate miniport driver are possible.

Figure 5:
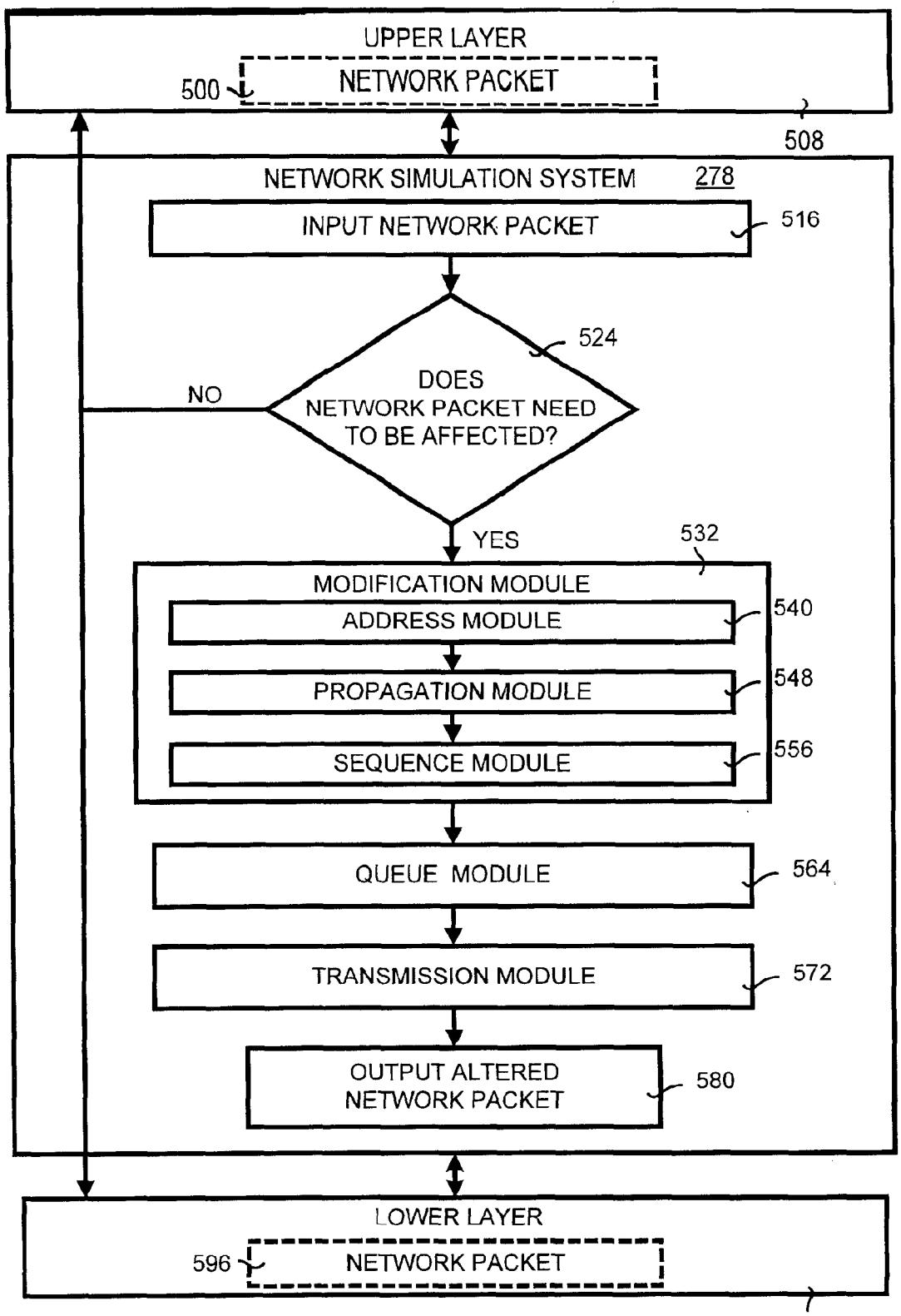
FIG. 5 is a general block-flow diagram illustrating the network simulation system shown in FIGS. 2–4.

FIG. 5 is a general block-flow diagram illustrating the network simulation system shown in FIGS. 2–4. Generally, the network simulation system 278 of the present invention captures a network packet from an upper or lower layer (depending on whether the packet is being transmitted or received), performs alterations on the packet and then places the altered network packet back into the packet stream. Specifically, in the case where a network packet 500 is being transmitted from an upper layer 508, the network simulation system 278 inputs the network packet 516 into the system 278. The system 278 determines whether the network packet needs to be affected 524. The factors affecting this determination are varied and may be implemented according to the needs of the user. For example, the system 278 may be configured to only affect packets that are of a certain protocol (such as transport control protocol (TCP) packets) or all packets having a destination address of a particular server. It should be noted that the determination whether a packet should be affected 524 may be made prior to inputting a network packet.

If it is determined that the network packet 500 does not need to be affected, the packet is passed to the next layer (for example, the upper layer 508 if the network packet 500 is being received and the lower layer 588 if the network packet 500 is being transmitted). In this case, the network packet 500 would be passed to the lower layer 588. Otherwise, the network packet 500 is sent to a modification module 532. The modification module 532 may include an address module 540, for replacing an original network address of the network packet 500 with a simulated network address, a propagation module 548, for altering the bandwidth of a stream of packets, and a sequence module 556, for altering other characteristics of the network packet 500 (such as, for example, packet loss, packet fragmentation, packet duplication and packet reordering).

The sequence module 556 also determines an order in which packets altered by the modification module 532 will be placed into a queue module 564. The queue module 564 is a storage location for the altered network packets until an appropriate time (known as the send time) when the altered packets are removed. A transmission module 572 removes an altered network packet from the queue module 564 and outputs the altered network packet 580 to, in this case, a lower layer 588. In the case where a network packet 596 is being received from the lower layer 588, network simulation system 278 returns the altered network packet to the upper layer 508.

IV. System and Operational Details

Figure 6:
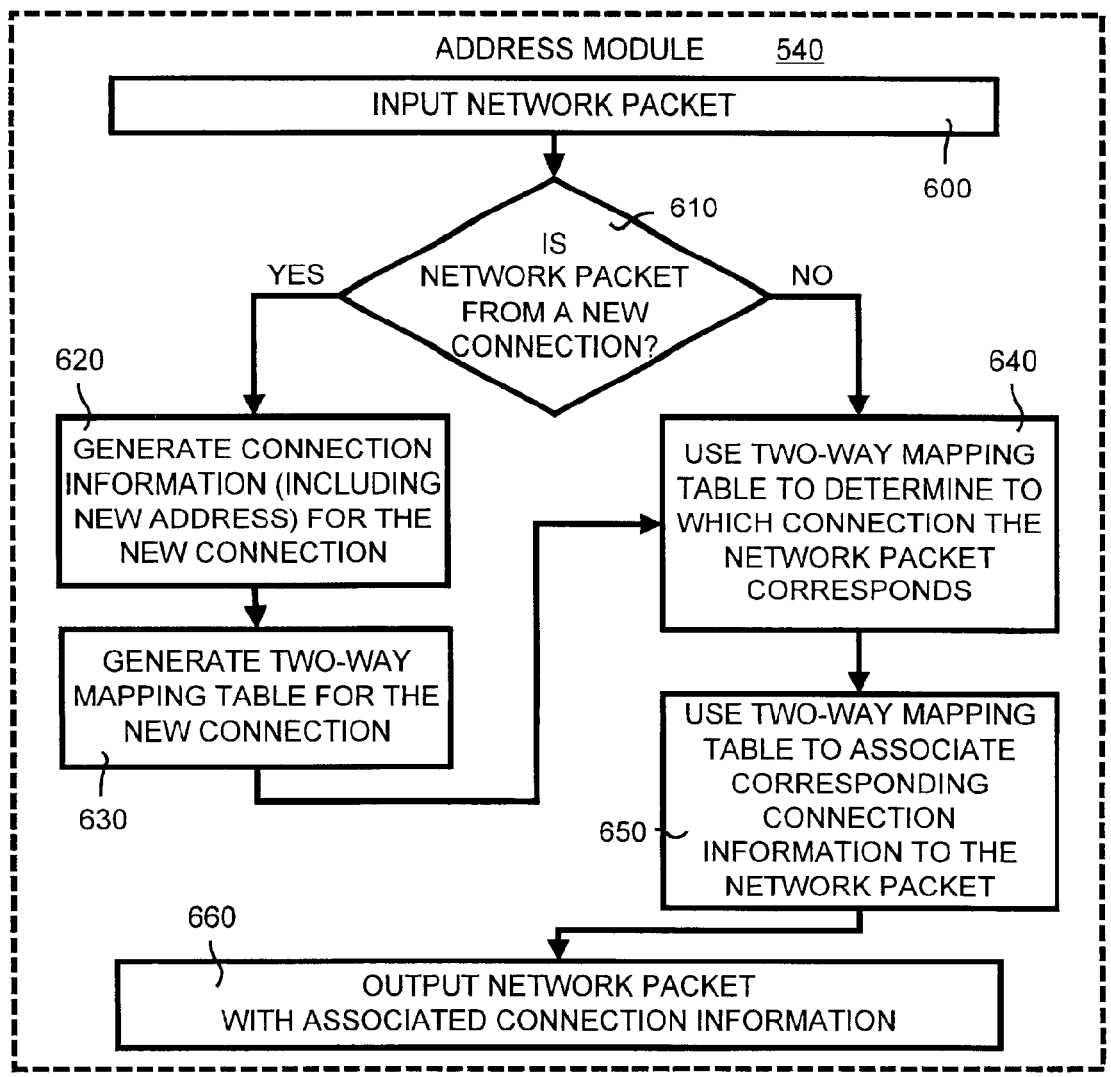
FIG. 6 is a detailed block-flow diagram illustrating the address module of the network simulation system shown in FIG. 5.

FIG. 6 is a detailed block-flow diagram illustrating the address module of the network simulation system shown in FIG. 5. Generally, the address module generates connection information for each new connection and maps each network packet to a connection. This connection information includes, for example, the bandwidth (including transmission speed) of the connection and a simulated network address. The simulated network address associated with the connection makes it appear to the server that packets are coming from a wide range of addresses (just as would be occurring if the server were connected to a WAN). For example, if a client is transmitting a packet to a server the address module of the present invention replaces the original network address of the client with a simulated source address. Similarly, when the packet is returned to the client by the server the address module replaces the simulated destination address of the client with the original network address of the client. Thus, to make it appear as though the server is receiving requests from a wide range of network addresses, the address module of the present invention only changes the network address of a client. Referring to FIG. 6, a network packet is received as input (box 600) and a determination made whether the network packet is from a new connection (box 610). If the address module 540 cannot find the connection that the packet came in on in a two-way mapping table then a new connection is created along with corresponding connection information. This new connection is then placed into the two-way mapping table so that other network packets received from that connection are mapped to the corresponding connection information.

By way of example and not limitation, at startup the two-way mapping table is generally empty. When a network packet is transmitted by a client to server (or vice versa) the packet is received by the address module 540. The address module 540 attempts to map the packet to the connection but is unable to find the connection in the two-way mapping table. Accordingly, the address module 540 creates a new connection, generates connection information for that new connection and enters that connection into the two-way mapping table so that future network packets from that connection can be mapped to the corresponding connection information. The address module 540 may also include a time-out feature where, after a period of inactivity (that may, for example, be determined by a user or a programmer), the connection is deleted from the two-way mapping table. If the network packet is from a new connection (i.e., the connection is not in the two-way mapping table) then new connection information is generated for the connection (box 620). New connection information includes, for example, the transmission speed and bandwidth of the new connection. In addition, the new connection information includes a new simulated address for the client that transmitted the network packet associated with the connection. Preferably, the connection information (including simulated address information) is randomly generated by the address module 540. Further, the connection and address information may be randomly chosen from a specified range or may be set to a specific value.

As stated above, once the connection information has been generated, an entry in the two-way mapping table is generated for the new connection (box 630). The two-way mapping table is used to map network packets to associated connection information. The mapping table is two-way because it is used to map both incoming and outgoing packets to connection information. For example, a TCP connection is identified uniquely by an IP address and port. If a network packet is being transmitted from the client (i.e. from a higher layer) a two-way mapping table uses an original client IP address and an original client port of that packet to map connection information and simulated IP address information to the packet. The original IP address and original port are mapped into a new, simulated IP address and port. The packet is then sent over the network to the server. The packet, when received by the server, appears to the server to have come from the simulated IP address and port rather than the original IP address and port. When the packet is returned by the server the two-way mapping table is used again to map the simulated IP address and port of the packet to its original IP address and port.

If the network packet is from an existing connection, the two-way mapping table is used to determine with which connection the network packet belongs (box 640). In addition, the two-way mapping table is used to associate connection information corresponding to that connection to the network packet (box 650). This connection information, which may be used by other modules, preferably is associated to the network packet by using a header. The network packet with the associated connection information is then sent as output (box 660).

Figure 7:
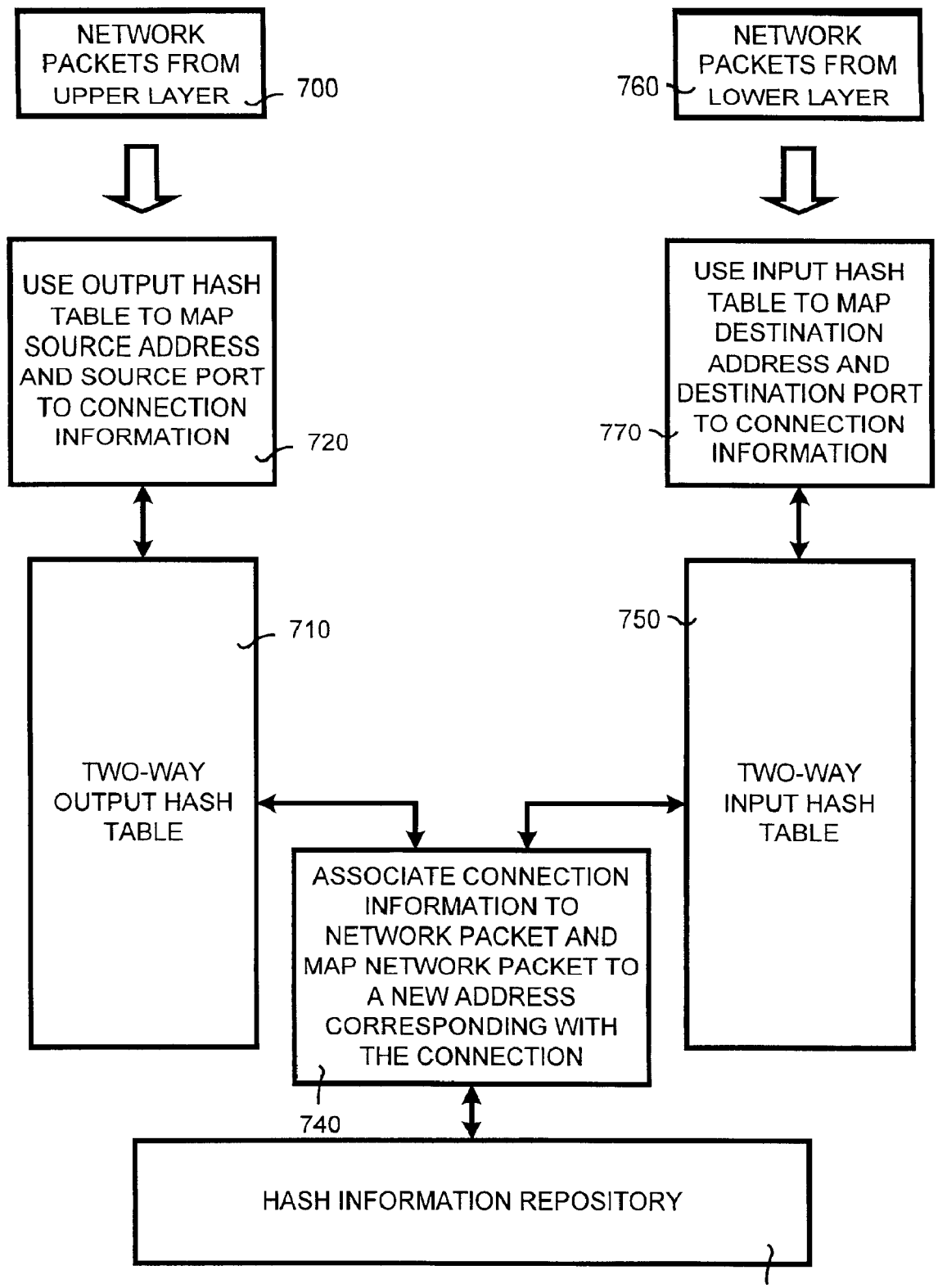
FIG. 7 illustrates a working example of the two-way mapping table of the address module.

FIG. 7 illustrates a working example of the two-way mapping table of the address module. In this working example, a two-way output hash table, a two-way input hash table and a hash information repository are used. A hash table, which is a common way of accessing records, creates an index key for a record by applying a formula and enters the record in the hash table under the index key. The record is retrieved by reapplying the formula to yield the index key to the stored record. This is more efficient than searching for the matching record through all the stored records.

In the case where a network packet is being transmitted to the network, the network packet comes down from an upper layer (box 700). The two-way output hash table 710 is used to map the source address and source port (i.e., the original client address and port) of the packet to connection information for that connection (box 720). After the network packet has been mapped to the connection information (which is stored in the hash information repository 730), the connection information (such as transmission speed and bandwidth) is associated to the network packet (box 740). In addition, the network packet is mapped to a new simulated address (box 740) using the two-way input hash table 750. In this case, the source IP address and source port are mapped by the two-way input hash table 750 to a newly-generated simulated IP address and port. The network packet is then passed on to a lower layer for transmission over the network.

When the network packet is transmitted back over the network and received by the client, a reverse mapping occurs. For example, assume the same network packet as described above is received from a lower layer (box 760). The two-way input hash table 750 is used to map the destination IP address and destination port (note that the destination IP address and port are the same as the simulated IP address and port) to connection information (box 770) contained in the hash information repository 730. The two-way output hash table 710 is then used to map the destination IP address and port back to the original address and port of the client. The network packet is then passed to the upper layer and returned to the original address and port.

Figure 8:
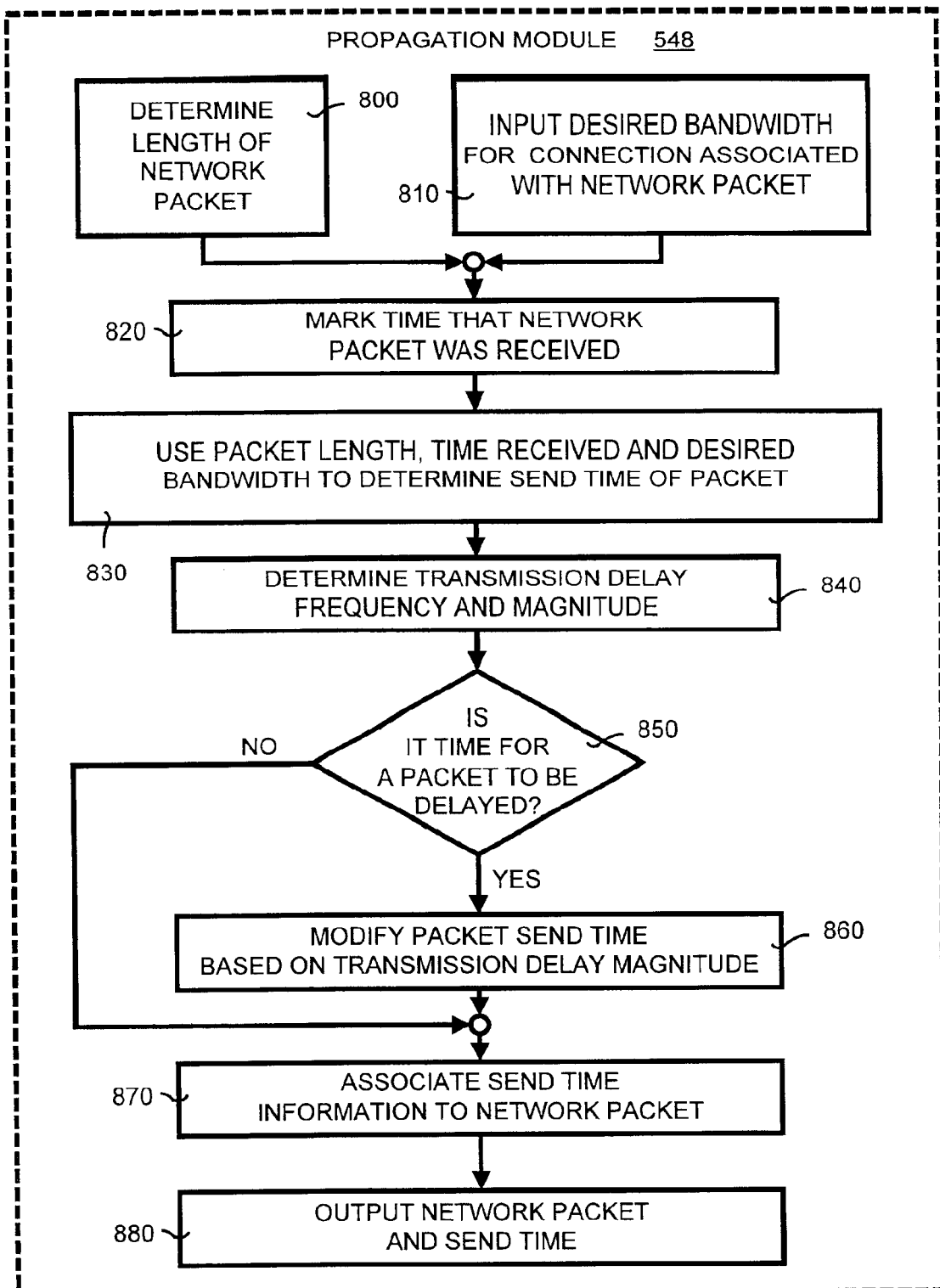
FIG. 8 is a detailed block-flow diagram illustrating the propagation module of the network simulation system shown in FIG. 5.

FIG. 8 is a detailed block-flow diagram illustrating the propagation module of the network simulation system shown in FIG. 5. Generally, the propagation module alters the propagation characteristics of a stream of packets to conform to the transmission speed for a certain connection. In other words, if a packet is assigned to a specific connection then the packet is altered to simulate the transmission speed associated with that connection. The propagation module 548 determines a send time (the time at which the packet should be sent from a queue) for each network packet. In addition, the propagation module 548 may modify the sent time to introduce a delay in the transmission of packets.

The propagation module 548 receives a network packet and determines the length of the packet (box 800). In addition, a desired bandwidth and transmission speed for the connection, which is preferably associated to the packet, is received as input (box 810). The time that the packet was received by the propagation module 548 is then marked (box 820) by a timing device (such as a system clock). Using the packet length, the time the packet was received, the desired bandwidth and transmission speed the send time of the packet can be easily determined using algebraic manipulation (box 830). For example, if packet is received at time t and needs to be sent at time $t_s$ to achieve a desired transmission speed, a delay d is calculated that needs to pass before the packet is sent.

The propagation module 548 may also include a delay simulation function that simulates a transmission delay caused by, for example, a router or communication link. A delay frequency and magnitude is determined (box 840), preferably at random. However, other embodiments include having preset or selectable delay frequency and magnitude. If the delay is implemented, a determination is made whether it is time for a packet to be delayed (box 850). If not, then the send time of the packet is not modified. If, however, it is time for a packet to be delayed the send time of the packet is modified based on the magnitude of the transmission delay (box 860). In either case, the send time is associated with the network packet (box 870) and the network packet and send time information are sent as output (box 880). Preferably, the send time is associated to the network packet in the form of a header.

Figure 9A:
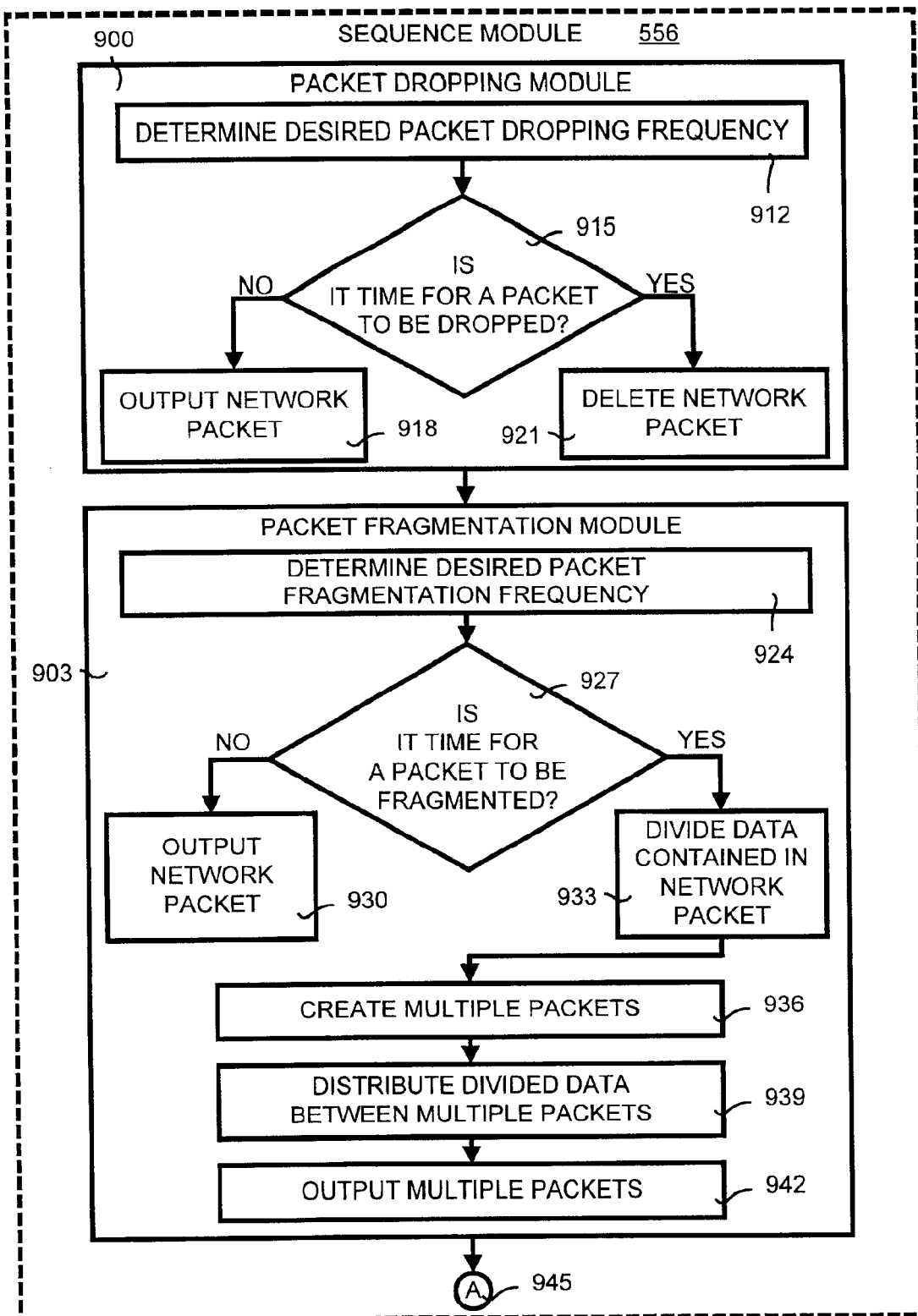
FIG. 9A is a detailed block-flow diagram illustrating the packet dropping and packet fragmentation modules of the sequence module shown in FIG. 5.
Figure 9B:
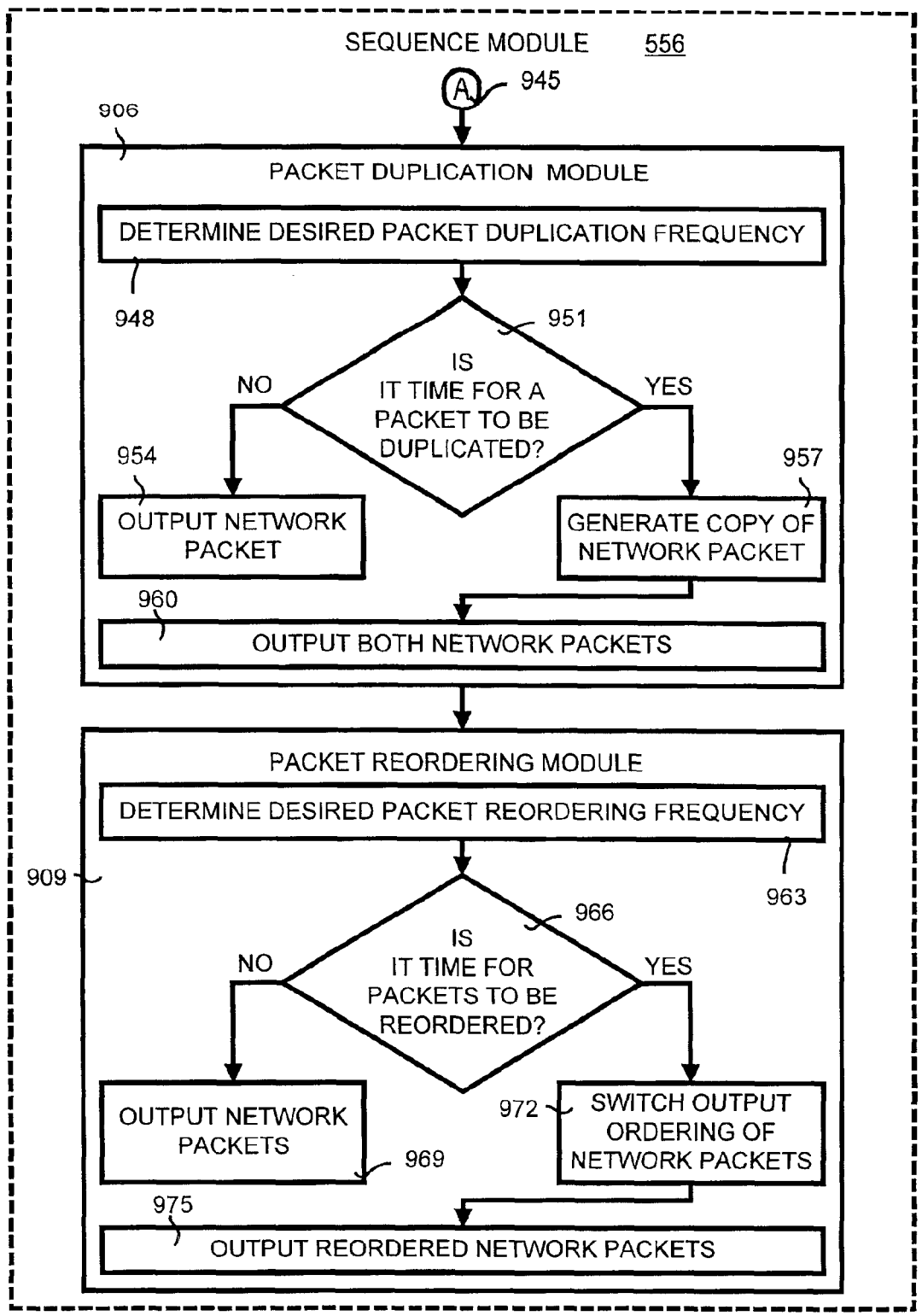
FIG. 9B is a detailed block-flow diagram illustrating the packet duplication and packet reordering modules of the sequence module shown in FIG. 5.

As shown in FIGS. 9A and 9B, the sequence module 556 of the present invention includes a packet dropping module 900, for simulating dropped packets, a packet fragmentation module 903, for fragmenting a packet, a packet duplication module 906, for duplicating a packet and a packet reordering module 909 for reordering packets. These modules of the sequence module 556 further alter the characteristics of a network packet to simulate desired network connection characteristics.

FIG. 9A is a detailed block-flow diagram illustrating the packet dropping and packet fragmentation modules of the sequence module shown in FIG. 5. In general, the packet dropping module 900 inputs a network packet and deletes the packet at an appropriate time. In particular, a packet dropping frequency is determined (box 912) that determines how often a packet should be dropped. Preferably, this frequency is determined randomly, but in other embodiments a simple formula (such as every tenth packet is dropped) is used. A determination is then made as to whether it is time for a packet to be dropped (box 915). If no, then the packet is sent as output (such as to the packet fragmentation module 903). If yes, then the packet is deleted (box 921).

The packet fragmentation module 903 simulates the effect that network devices (such as routers) have on network packets. For example, if a network router is busy and the incoming packet is too large, the packet will be divided into smaller pieces. This packet fragmentation is simulated by the packet fragmentation module 903. Specifically, a packet fragmentation frequency is determined (box 924) in a manner as described above in connection with the packet dropping module 900. The fragmentation frequency includes how often a packet should be fragmented, the number of fragments and the size of each fragment.

The module 903 then determines whether it is time for a packet to be fragmented (box 927). If no, then the network packet is sent as output (box 930), such as to the packet duplication module 906. Otherwise, data contained within the packet is divided into the number of fragments (box 933). The data may be divided equally or unequally, depending on the size of each fragment. Each network packet is then created (along with headers corresponding to the amount of data in packet) for each fragment (box 936) and the divided data is distributed into each of the fragments (box 939). The fragments are then sent as output in the form of multiple packets (box 942).

FIG. 9B is a detailed block-flow diagram illustrating the packet duplication and packet reordering modules of the sequence module shown in FIG. 5. The packet duplication module 906 receives the network packet (box 945) from the packet fragmentation module 903. A desired duplication frequency is then determined (box 948) using the technique described above for the packet dropping module 900. The module 906 then determines whether it is time for a packet to be duplicated (box 951). If not, then the packet is sent as output (box 954). If yes, then a copy of the packet is generated (box 957) and both the original and copy of the packet are sent as output (box 960). For example, if the network protocol being used is TCP/IP then transport level protocol headers are generated for every newly created fragment of the packet.

The packet reordering module 909 simulates the reordering of packets that occurs when packet are received in a different order than when they were sent. This can occur when adjacent packets are sent over different network paths, and the first packet sent is the last packet received. The packet reordering module 909 first determines a desired packet reordering frequency (box 963) in a manner similar to the packet dropping module 900. This frequency dictates how often packets are reordered. The module 909 then determines whether it is time for packets to be reordered (box 966). If no, then the packets are sent as output (box 969). Otherwise, the order of packets is switched (box 972) by exchanging the placement of one packet with another packet. The reordered packets are then sent as output (box 975).

Figure 10:
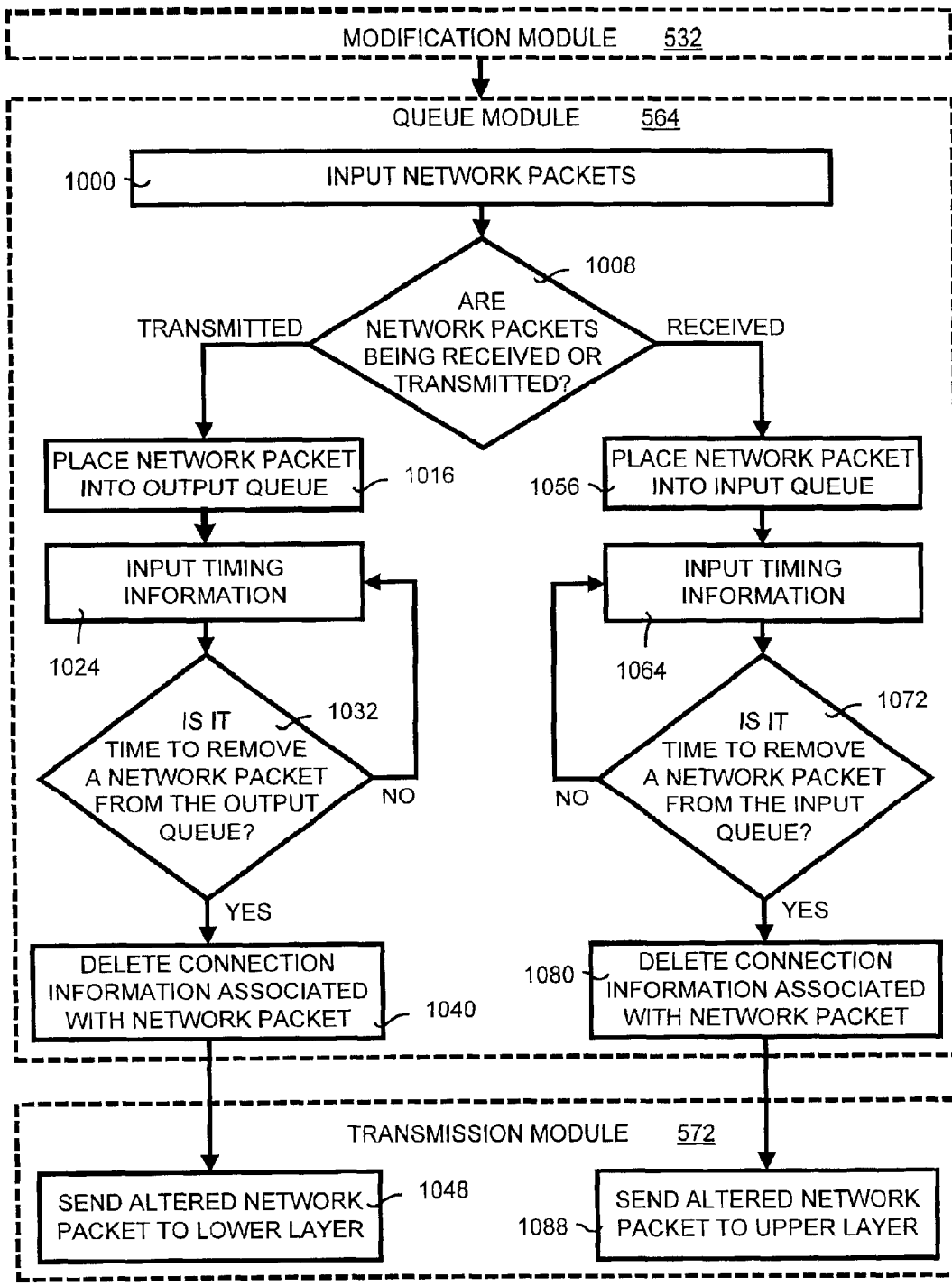
FIG. 10 is a detailed block-flow diagram illustrating the queue module of the network simulation system shown in FIG. 5.

FIG. 10 is a detailed block-flow diagram illustrating the queue module of the network simulation system shown in FIG. 5. In general, the queue module 564 receives a network packet and sends the packet at a designated time to the transmission module 572. The queue module 564 includes an output queue, for storing a packet that is being transmitted, and an input queue, for storing a packet that has been received from the network. Each queue has a moving pointer the tracks the current time. When the current time is equal to or greater than a time to send a packet then the packet is removed from the queue and sent to the transmission module 572. Generally, two threads of execution are being performed in each queue. One thread of execution has the modification module 532 pushing packets into the queue and another thread has the transmission module 572 tracking the time and sending the packets from the queue at a specified time.

As shown in FIG. 10, the queue module 564 inputs a network packet (box 1000) and determines whether the packet is being received from a lower layer or transmitted from a higher layer (box 1008). If a packet is being transmitted, the network packet is placed into the output queue (box 1016). Timing information (such as the current time and the send time) is received (box 1024) by the module 564 and a determination made whether it is time to remove the packet from the output queue (box 1032). If no, then the timing information is checked again (box 1024). If yes, then the connection information (including the timing information) associated with the packet is deleted from the packet (box 1040). Preferably, this means that the header containing this connection information is removed from the packet. The packet that has been altered by the modification module 532 is then sent to the transmission module 572 where the altered network packet is sent to a lower layer (box 1048) for transmission over the network.

If a packet is being received, the network packet is placed into the input queue (box 1056). Timing information is received (box 1064) and the module 564 determines whether it is time to remove the packet from the input queue (box 1072). If not, then updated timing information is received as input (box 1064). If yes, then connection information associated with the packet is deleted (box 1080), which preferably means that a header containing the connection information is deleted. The altered network packet is then sent to an upper layer (box 1088) for input by the sending client.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method of simulating connection characteristics of a network, comprising:
   providing a driver capable of accessing a stream of network packets;
   calculating a send time for each of the network packets and attaching the respective send time to the corresponding packet;
   sequencing the network packets in a queue until the respective send times to simulate a desired propagation connection characteristic;
   deleting the send time from each network packet when the packet is removed from the queue; and
   altering the stream of network packets to simulate an additional connection characteristic of the network;
   wherein the propagation connection characteristic is at least one of: (a) bandwidth; (b) transmission delay;
   wherein the additional connection characteristic of the network is at least one of: (a) loss of a network packet; (b) fragmentation of a network packet; (c) reordering of at least two network packets; (d) duplication of a network packet; (e) network address translation of a network packet having an original network address.

2. The method of claim 1, wherein altering the stream of network packets to simulate the network address translation of the network packet comprises:
   generating a simulated network address for each new connection; and
   mapping the original network address to the simulated network address for each network packet.

3. The method of claim 2, wherein the simulated network address is generated randomly.

4. The method of claims 2, wherein the mapping is performed using a two-way mapping table.

5. The method of claim 4, wherein the two-way mapping table is a two-way hash table.

6. The method of claim 4, wherein the mapping uses a two-way output mapping table if the network packet is being transmitted and a two-way input mapping table if the network packet is being received.

7. The method of claim 5, wherein the mapping uses a two-way output hash table, a two-way input hash table and a hash information repository.

8. The method of claim 1, wherein altering the stream of network packets to simulate the loss of a network packet comprises:
   determining a packet dropping frequency; and
   deleting the network packet at the packet dropping frequency.

9. The method of claim 1, wherein altering the stream of network packets to simulate the fragmentation of the network packet comprises:
   determining a packet fragmentation frequency;
   separating the network packet into a plurality of new network packets at the packet fragmentation frequency;
   dividing data contained in the network packet; and
   distributed the divided data between the new network packets.

10. The method of claim 9, further comprising creating headers for the new network packets.

11. The method of claim 9, wherein the divided data is distributed disproportionately between the new network packets.

12. The method of claim 1, wherein altering the stream of network packets to simulate the reordering of at least two network packet comprises:
    determining a packet reordering frequency; and
    changing an order of the at least two network packets within the network packet stream at the packet reordering frequency.

13. The method of claim 1, wherein altering the stream of network packets to simulate the duplication of the network packet comprises:
    determining a packet duplication frequency; and
    generating a copy of the network packet at the packet duplication frequency.

14. A method of simulating connection characteristics of a network, comprising:
    providing a driver capable of accessing a stream of network packets;
    calculating a send time for each of the network packets and attaching the respective send time to the corresponding packet;
    sequencing the network packets in a queue until the respective send times to simulate a desired propagation connection characteristic;
    deleting the send time from each network packet when the packet is removed from the queue; and
    altering the stream of network packets to simulate an additional connection characteristic of the network;
    wherein the propagation connection characteristic is at least one of: (a) bandwidth; (b) transmission delay;
    wherein simulating a desired bandwidth comprises:
      determining a length of a network packet;
      calculating the send time for the network packet using the network packet length to simulate the desired bandwidth.

15. A method of simulating connection characteristics of a network, comprising:
    providing a driver capable of accessing a stream of network packets;
    calculating a send time for each of the network packets and attaching the respective send time to the corresponding packet;
    sequencing the network packets in a queue until the respective send times to simulate a desired propagation connection characteristic;
    deleting the send time from each network packet when the packet is removed from the queue; and
    altering the stream of network packets to simulate an additional connection characteristic of the network;
    wherein the propagation connection characteristic is at least one of: (a) bandwidth; (b) transmission delay;
    wherein simulating a desired transmission delay comprises adding the desired transmission delay to the send time.

16. A method of simulating connection characteristics of a network, comprising:
    providing a driver capable of accessing a stream of network packets;
    calculating a send time for each of the network packets and attaching the respective send time to the corresponding packet;
    sequencing the network packets in a queue until the respective send times to simulate a desired propagation connection characteristic;
    deleting the send time from each network packet when the packet is removed from the queue; and altering the stream of network packets to simulate an additional connection characteristic of the network;

wherein the propagation connection characteristic is at least one of: (a) bandwidth; (b) transmission delay;

wherein altering the stream of network packets comprises changing a network address of each client connection.

17. A method of simulating connection characteristics of a network, comprising:

providing a driver capable of accessing a stream of network packets;

calculating a send time for each of the network packets and attaching the respective send time to the corresponding packet;

sequencing the network packets in a queue until the respective send times to simulate a desired propagation connection characteristic;

deleting the send time from each network packet when the packet is removed from the queue; and altering the stream of network packets to simulate an additional connection characteristic of the network;

wherein the driver is implemented in an intermediate layer between an upper layer and a lower layer;

wherein the upper layer processes the network packets and the lower layer places the network packets onto a physical media of the network.

* * * * *